United States Patent
Zimmermann et al.

(10) Patent No.: US 7,195,385 B2
(45) Date of Patent: Mar. 27, 2007

(54) VEHICLE LIGHT FOR A VEHICLE, PREFERABLY A MOTOR VEHICLE

(75) Inventors: Werner Zimmermann, Ottenbach (DE); Bernd Rommel, Fellbach-Schmiden (DE)

(73) Assignee: Schefenacker Vision Systems Germany GmbH & Co. KG, Esslingen (DE)

( * ) Notice: Subject to any disclaimer, the term of this patent is extended or adjusted under 35 U.S.C. 154(b) by 14 days.

(21) Appl. No.: 10/605,986

(22) Filed: Nov. 12, 2003

(65) Prior Publication Data

US 2004/0160782 A1  Aug. 19, 2004

Related U.S. Application Data

(63) Continuation-in-part of application No. 10/016,368, filed on Dec. 10, 2001, now abandoned.

(30) Foreign Application Priority Data

Dec. 16, 2000  (DE) .......................... 200 21 312 U

(51) Int. Cl.
*F21S 2/00* (2006.01)

(52) U.S. Cl. ...................... 362/540; 362/800; 362/806

(58) Field of Classification Search ................ 362/488, 362/555, 497, 498, 499, 510, 540, 541, 542, 362/545, 800, 806, 268, 267, 293, 364, 543, 362/544, 511, 521, 546, 547, 549, 509; 359/839, 359/742
See application file for complete search history.

(56) References Cited

U.S. PATENT DOCUMENTS

| | | | | | |
|---|---|---|---|---|---|
| 1,274,340 | A | * | 7/1918 | Shanley | 362/499 |
| 1,457,565 | A | * | 6/1923 | Warrick | 362/510 |
| 1,721,903 | A | * | 7/1929 | Graff | 362/488 |
| 2,963,613 | A | * | 12/1960 | Foti | 313/117 |
| 4,480,291 | A | * | 10/1984 | Dranginis | 362/517 |

* cited by examiner

*Primary Examiner*—Sandra O'Shea
*Assistant Examiner*—Sharon Payne
(74) *Attorney, Agent, or Firm*—Gudrun E. Huckett

(57) ABSTRACT

A vehicle light has at least one vehicle light housing having an open end and configured to be arranged on an inner side of a vehicle part of the vehicle. At least one illumination element is arranged in the vehicle light housing. The vehicle part has a light-transmissive area covering the open end of the vehicle light housing, wherein the light-transmissive area allows rays emitted by the illumination element to pass through to the exterior. The vehicle part can be the trunk lid or the exterior rearview mirror of the vehicle. The light-transmissive area is covered with a coating having a thickness such that, when the illumination element is switched off, the light transmissive area is invisible from the exterior of the vehicle and such that light emitted by the illumination element passes through the coating when the at least one illumination element is switched on.

26 Claims, 7 Drawing Sheets

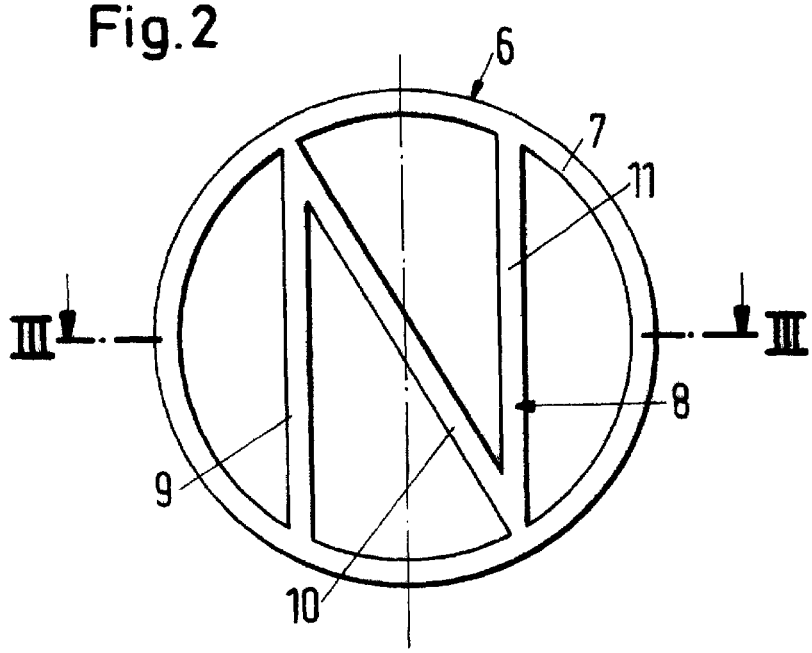
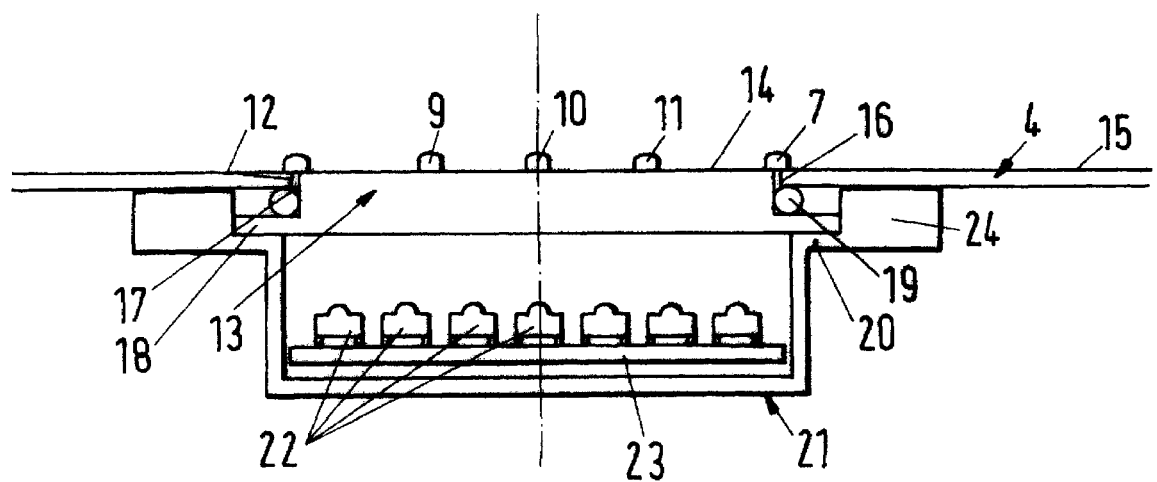

VEHICLE LIGHT FOR A VEHICLE, PREFERABLY A MOTOR VEHICLE

CROSS REFERENCE TO RELATED APPLICATIONS

This application is a continuation-in-part of application Ser. No. 10/016,368 filed Dec. 10, 2001, and now abandoned.

BACKGROUND OF INVENTION

1. Field of the Invention

The invention relates to a vehicle light for vehicles, preferably motor vehicles, comprising at least one housing in which at least one illumination element is arranged and which is provided at the inner side of a car body part of a vehicle.

2. Description of the Related Art

Such vehicle lights are fastened as separate units on the car body of the vehicle. These vehicle lights are either mounted in receiving openings of the car body or are connected to the outer side of the car body.

SUMMARY OF INVENTION

It is an object of the present invention to configure a vehicle light of the aforementioned kind such that it can be mounted easily on the vehicle.

In accordance with the present invention, this is achieved in that the car body part in the area of the vehicle light is at least partially transmissive for the rays emitted by the illumination element(s).

The light which is emitted by the illumination element of the vehicle light according to the invention passes through the car body part of the vehicle to the exterior. Advantageously, the car body part is provided in the light-transmissive area with at least one opening into which a light-transmissive lens is inserted. Its outer side is preferably provided with a protective layer, preferably a coat of paint, which preferably has the same color as the remaining paint finish of the vehicle. In this case, the vehicle light is not visible from the exterior because the light-transmissive area is covered by the protective layer. Only when the illumination element of the vehicle light according to the invention is switched on, the rays emitted by it penetrate the lens as well as the protective layer and reach the exterior. The protective layer is so thin that the light can be emitted to the required degree.

BRIEF DESCRIPTION OF DRAWINGS

FIG. 2 shows an enlarged detail view of the vehicle lights according to FIG. 1.

FIG. 3 is an enlarged detail of a section along the section line III—III of FIG. 2.

DETAILED DESCRIPTION

Figure 1:
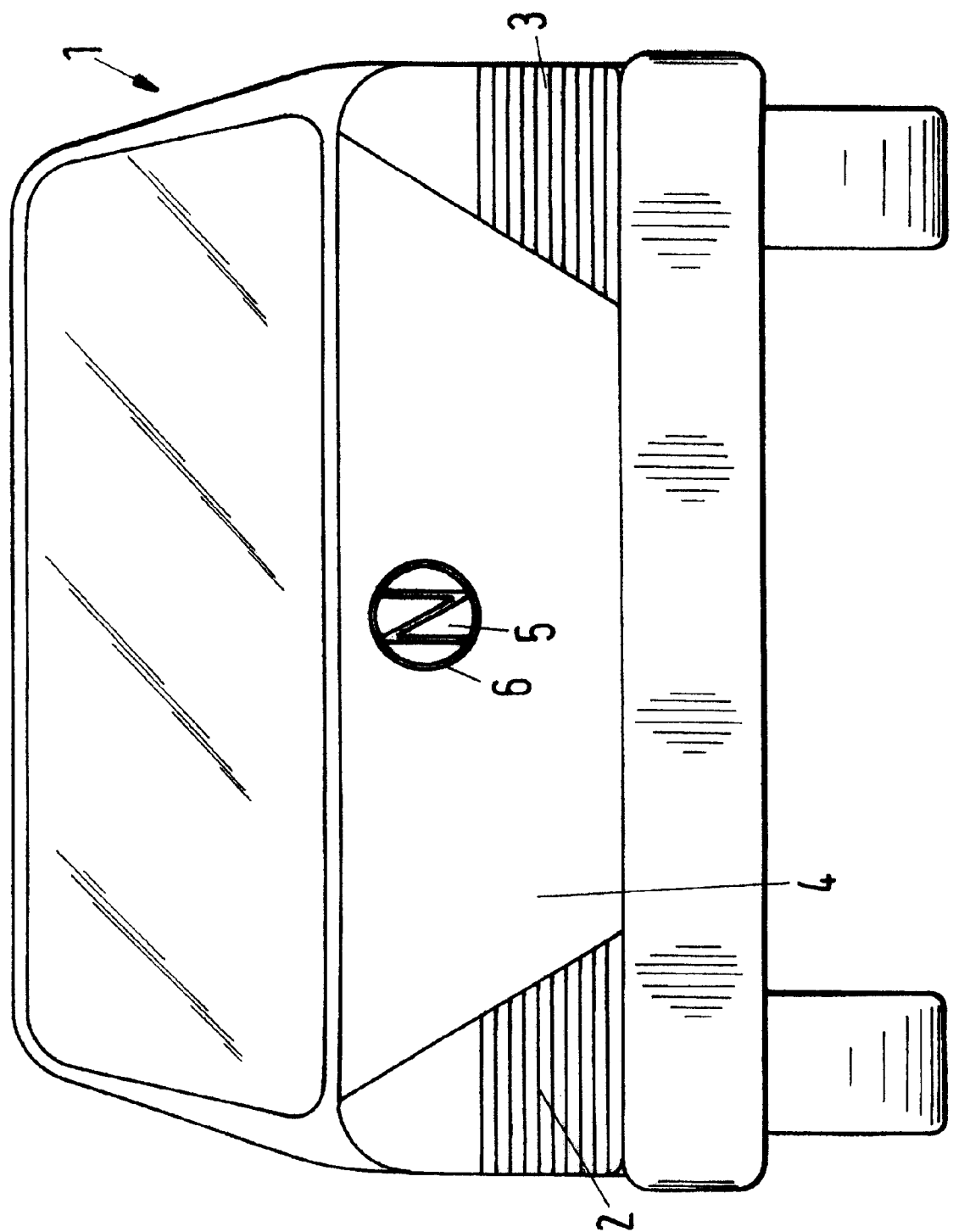
FIG. 1 shows the tail of a motor vehicle with vehicle lights according to the invention.

FIG. 1 shows a view of the tail of a vehicle 1 which, as is known in the art, has two taillights 2 and 3. Between the taillights 2, 3, the trunk lid 4 extends whose substantially vertically extending portion is provided with a vehicle light 5 which can serve, for example, as a third brake light. This vehicle light 5 is located at the inner side of the trunk lid 4 in the area behind a motor vehicle emblem 6 which, depending on the manufacture of the motor vehicle, can have the most different shapes and/or configurations.

In the illustrated embodiment, the emblem has a circular ring 7 (FIG. 2) which surrounds the letter N (8). This letter has two parallel extending stays 9, 11 which are connected to one another at their oppositely positioned ends by a slanted stay 10. The emblem 6 is fastened to the outer side of the trunk lid 4, for example, by means of an adhesive. In the area of this emblem 6, the trunk lid 4 is provided with an opening 12 into which a lens 13 is inserted (FIG. 3). It fills the opening 12 almost completely. The outer side 14 of the lens 13 is flush with the outer side 15 of the trunk lid 4. Between the edge of the lens 13 and the edge 16 of the opening 12, a small gap 17 remains which is covered at the outwardly facing side by the ring 7 of the emblem 6. The lens 13 is matched with regard to its contour to the ring 7 so that the ring covers the gap 17 relative to the exterior. Accordingly, complex measures for sealing the gap 17 relative to the exterior are not required. Accordingly, it is not necessary to observe narrow tolerances when manufacturing the opening 12 in the trunk lid 4.

The lens 13 is provided at a spacing from its outer side 14 with a circumferential collar or flange 18 which extend radially outwardly and provides a support part for supporting an annular seal 19 positioned in the space provided between the facing sides of the inner side of the trunk lid 4 and of the collar 18. By means of the seal 19 the gap 17 is sealed relative to the inner side of the trunk lid 4 so that no moisture and/or the dirt can reach the interior of the trunk. When mounting the lens 13, the annular seal 19 is elastically deformed so that it can seal the gap 17 optimally from the interior.

Figure 4:
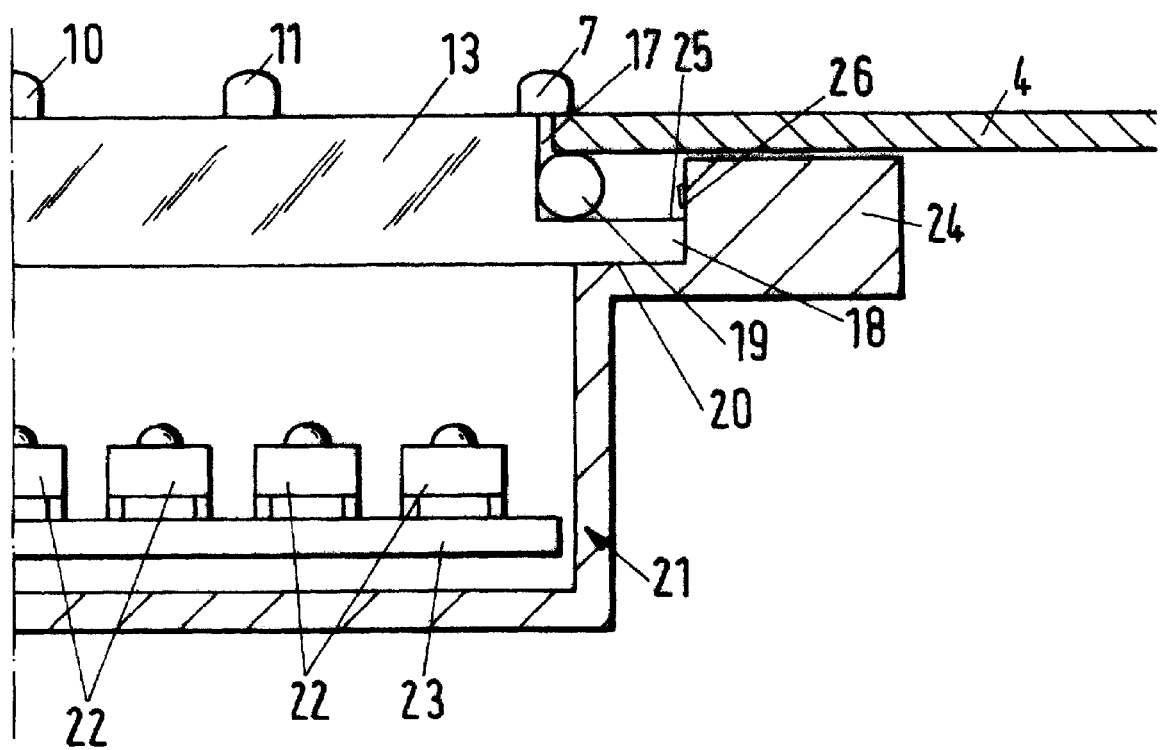
FIG. 4 shows an enlarged detail of one half of the vehicle light according to FIG. 3.

The circumferential collar 18 of the lens 13 is positioned on a radial shoulder surface 20 of the vehicle light housing 21 in which at least one illumination element 22 is arranged, in the illustrated embodiment in the form of LEDs. The LEDs are positioned on a printed circuit board 23 arranged within the vehicle light housing 21. The vehicle light housing 21 is fastened, for example, glued, with its circumferential rim 24, having a greater thickness than the rest of the housing 21, to the inner side of the trunk lid 4. This rim 24 project past the radial shoulder surface 20 on which the annular collar or flange 18 of the lens 13 rests. The collar 18 has a circumferential surface 25 resting against the inner side 26 of the housing rim 24 (FIG. 4) so that the lens 13 is properly secured perpendicularly to its axis. The inner side 26 of the housing rim 24 adjoins at a right angle the shoulder surface 20.

The illumination elements 22 are positioned at a spacing behind the lens 13 and emit the light through the lens 13 to the exterior. Electrical supply lines (not illustrated) are guided into the closed housing 21 in order to supply the illumination element 22 with electric current.

In order for the lens 13, which is comprised of a light-transmissive material, in particular, a light-transmissive plastic material, not to be visible from the exterior within the trunk lid 4, a coat of paint is applied onto its outer side 14 and the color of the coat of paint matches the color of the paint finish on the trunk lid 4. Accordingly, the lens 13 cannot be identified as an auxiliary component within the trunk lid 4 as long as the illumination elements 22 are not switched on. Thus, when the illumination elements 22 are not switched on, only the emblem 6 can be seen on the trunk lid 4. However, when the illumination elements 22 are switched on, the rays emitted by them penetrate the lens 13 and the intermediate spaces within the emblem 6 and reach the exterior. The coat of paint applied to the outer side 14 of the lens 13 is only so thin that the light can pass through the lens 13 and the coat of paint with satisfactory illumination. The vehicle light 5 can be, for example, a brake light. The illumination elements 22 then illuminate upon actuation of the brake and send a corresponding warning signal through the lens 13 to the rear.

The coat of paint applied to the outer side 14 of the lens 13 however is so thick that the lens 13 is not visible from the exterior so that the trunk lid 4 is of a uniform color.

The emblem 6 can have different shapes, for example, those of the different logos of the different car manufacturers. Moreover, the emblem 6 can also have any freely selected shape or configuration. The emblem 6 can also be an image, a word, numbers, a combination of these elements and the like. The contour of the lens 13 is matched advantageously to the contour of the respective emblem 6 so that the transition from the lens 13 to the edge of the mounting opening provided in the trunk lid 4 is covered from the exterior by the emblem itself.

Mounting of the vehicle light housing 21 can be performed simply and inexpensively. The vehicle light housing 21 is placed onto the inner side of the trunk lid 4 such that the lens 13 fills the opening 12. The housing 21 is then fastened on the inner side of the trunk lid 4 such that the outer side 14 of the lens 13 forms a continuous extension of the outer side 15 of the trunk lid 4. Subsequently, the emblem 6 or a corresponding symbol is mounted on the outer side of the trunk lid 4 such that the gap 17 between the edge 16 of the opening 12 and the edge of the lens 13 is covered. The annular seal 19 is pre-mounted in the housing 21 before mounting the vehicle light housing 21 by being slipped onto the lens 13 to such an extent that it rests on the radially outwardly extending annular collar or flange 18 which is provided at a spacing from the outer side 14 of the lens 13.

The emblem 6 itself is comprised of a material which does not allow light to pass through. However, it is also possible to manufacture the emblem 6 itself of a light-transmissive material. In this case, the trunk lid 4 in the area of the respective parts of the emblem 6 is made to be light-transmissive. In this case, in the embodiment illustrated in FIG. 2 the ring 7 as well as the three stays 9 to 11 are manufactured of light-transmissive material. The portions of the trunk lid 4 are not light-transmissive in the area between the ring 7 and the stays 9 to 11 but are light-transmissive only in the area underneath the ring 7 and underneath the stays 9 to 11. As long as the illumination elements 22 are not switched on, the emblem 6 has its own color. For example, the emblem 6 can be of a chrome color. When the illumination elements 22 are switched on, the emitted rays penetrate through the light-transmissive portions of the trunk lid 4 arranged underneath the ring 7 and the stays 9 to 11 as well as through the ring 7 and the stays 9 to 11 themselves to the exterior.

However, it is also possible that the emblem 6 and the surfaces areas of the trunk lid 4 in the area between the ring 7 and the stays 9–11 are light-transmissive.

Figure 5:
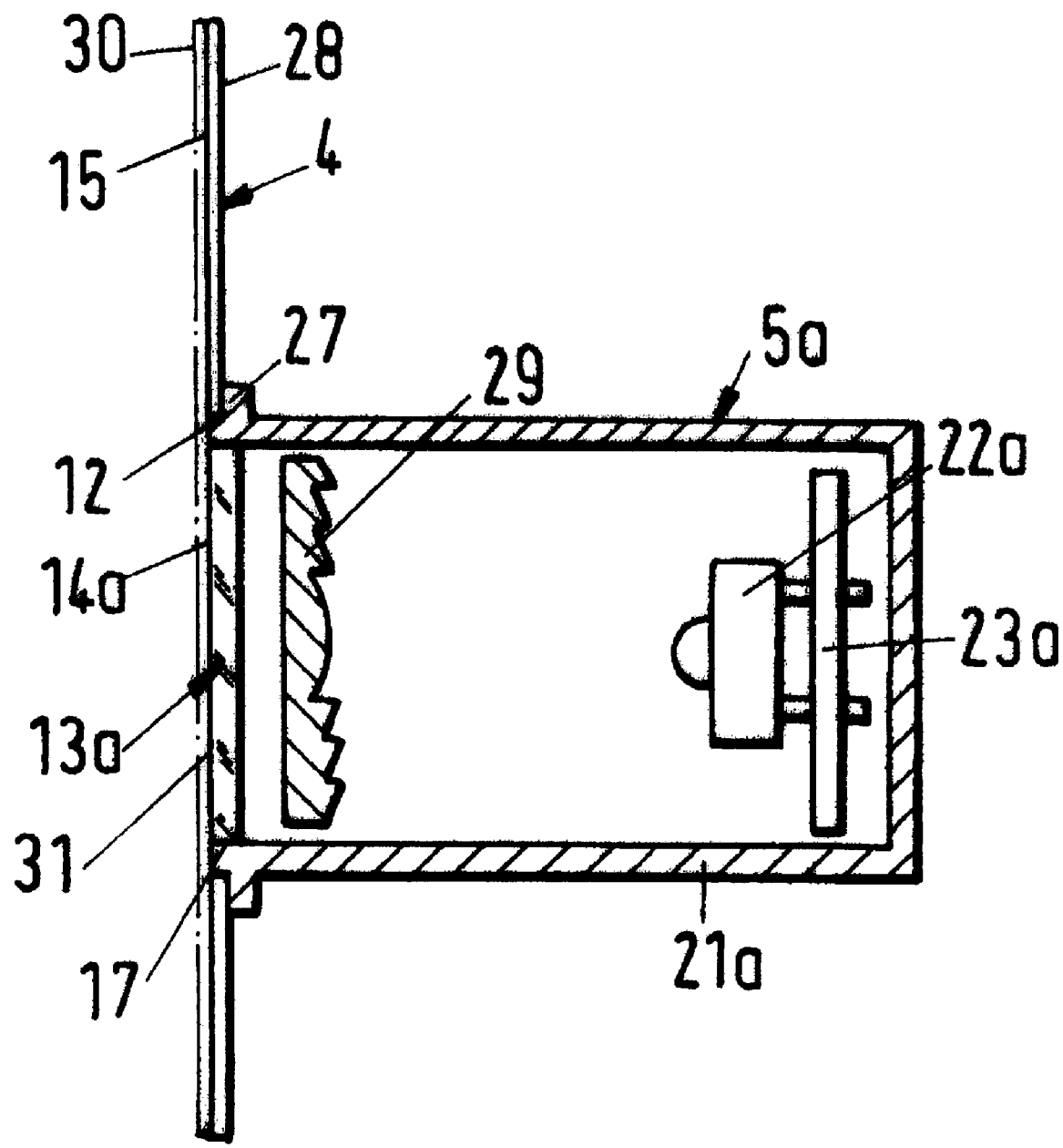
FIG. 5 is a section of a second embodiment of a vehicle light according to the invention.

FIG. 5 shows a further embodiment of a vehicle light 5a. It comprises a vehicle light housing 21a, in which at least one illumination element 22a is arranged. As in the preceding embodiment, the illumination element 22a is preferably an LED which is seated on a printed circuit board 23a. The vehicle light housing 21a has a radially outwardly projecting annular flange 27 and this flange 27 rests against the inner side 28 of the trunk lid 4. The trunk lid 4 is provided with a mounting opening 12 into which the vehicle light housing 21a projects with its free edge. A lens 13a is inserted into this free end of the housing 21a such that its outer side 14a is flush with the outer side 15 of the trunk lid 4. As in the preceding embodiment, the lens 13a closes off the vehicle light housing 21a.

At a minimal spacing behind the lens 13, an optical element or optical lens 29, for example, a Fresnel lens is arranged in the light housing 21a in the radiation path of the rays emitted by the illumination element 22a.

On the trunk lid 4, a coat of paint 30 is provided which is indicated by a dash-dotted line. A coat of paint 31 is provided on the lens 13a. On the one hand, it is so thin that the light emitted by the illumination element 22a can penetrate through this coat of paint 31, but, on the other hand, so thick that the lens 13a cannot be recognized from the exterior. The trunk lid 4 has thus a uniform appearance. Only when the illumination element 22a is switched on and the rays pass through the lens 13a and the coat of paint 31 to the exterior, is it possible to detect that a vehicle light 5a is present in the trunk lid 4.

In contrast to the preceding embodiment, the gap 17 between the rim of the lens 13a and the rim of the mounting opening 12 is filled, for example, with a filler so that a proper transition from the lens 13a to the trunk lid 4 is realized. As a result of the subsequent painting, the filler is covered so that it is not visible. As in the preceding embodiment, the lens 13a with its outer side 14a is flush relative to the outer side 15 of the trunk lid 4. The trunk lid 4 therefore has a uniform appearance.

In both embodiments, the lights 5, 5a can be positioned at any suitable location of the trunk lid 4 of the vehicle. The trunk lid can also be the rear hatch of a motor vehicle. The vehicle light can moreover also be provided on other suitable areas of the car body of the vehicle, for example, on the lateral forward and rearward fenders. The vehicle lights 5, 5a can have the most different signal functions, for example, can act as a brake light, a turn signal light and the like.

The trunk lid 4 or the rear hatch of the motor vehicle can be molded or injection-molded of a transparent plastic material and subsequently painted in the desired color. The vehicle light 5, 5a in this case can also be mounted in the described way at the inner side of the trunk lid 4 or the rear hatch at any desired location. In the area of the vehicle light 5, 5a the coat of paint is again of such a thickness that the lens 13, 13a is covered but the light emitted by the illumination elements 22, 22a can penetrate to a sufficient degree to the exterior.

It is moreover possible to injection-mold the trunk lid 4, the rear hatch or another car body part of the motor vehicle of an opaque plastic material and to injection-mold the lens 13, 13a of a transparent plastic. Subsequently, the trunk lid 4, the rear hatch or the other car body part and/or the lens 13, 13a are painted in the color of the vehicle so that the lens cannot be detected from the exterior.

Instead of the lens 13, 13a, it is possible to provide a fine perforation in the car body part in the area of the vehicle light 5, 5a. The perforation openings are filled in with transparent material, in particular, by casting. Since the perforation openings have a very small diameter, they cannot be seen from the exterior. The light emitted by the illumination elements 22, 22a arranged behind these perforations can pass through the transparent material in these perforation openings and reach the exterior. It is also possible to cover the exit of the perforation openings with a coat of paint 31 which again is only so thick that the perforation openings cannot be detected from the exterior but allow the passage of light.

The lens 5a can have the most different contours. For example, it can have a round contour, in particular, a circular contour, but also an angular or polygonal, in particular, rectangular contour. Accordingly, the perforation openings can be provided in a round or polygonal area.

Figure 6:
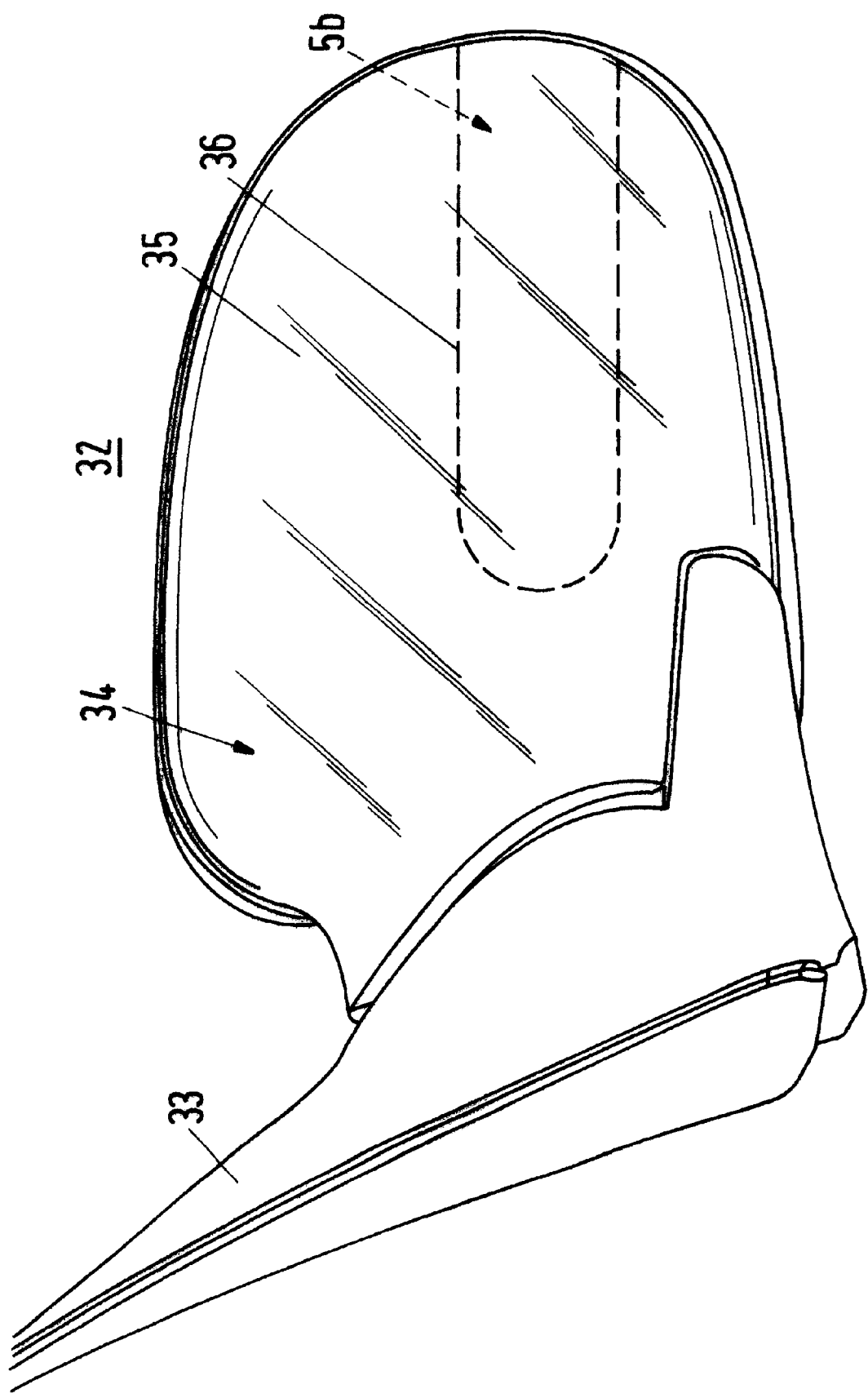
FIG. 6 shows the back of an external rearview mirror of a motor vehicle with a further embodiment of a vehicle light according to the invention.

FIG. 6 shows the possibility to provide the vehicle light 5b in an exterior rearview mirror 32 of the motor vehicle. The exterior rearview mirror 32 is fastened with a mirror base 33 on the motor vehicle, as is known in the art. The mirror base 33 supports the mirror head 34 which is foldable relative to the mirror base 33 in and counter to the travel direction of the motor vehicle. In the mirror head 34 a vehicle light 5b is provided which, for example, is an auxiliary turn signal. The wall 35 of the housing of the mirror head 34 facing forwardly in the travel direction is manufactured of a transparent plastic material in the area in which the light emitted by the vehicle light is to pass to the exterior. It is painted with a paint of a matching color only so thinly that the vehicle light 5b arranged within the mirror head 34 cannot be recognized from the exterior but the light emitted by it can penetrate to the exterior to a satisfactory degree. In the shown embodiment, this area 36 is illustrated by dashed lines. This area 36 extends from the outermost end of the mirror head 34 in the direction toward the mirror base 33 and ends at a spacing therefrom. This illumination area 36 of course can have any other suitable contour.

It is also possible to configure the housing of the mirror head 34 in the area 36 such that the vehicle light 5b can be recognized to some degree within the mirror head 34 from the exterior.

FIGS. 7 to 10 illustrate a further embodiment of an exterior rearview mirror 32 of a motor vehicle. The exterior rearview mirror 32 has a base member 33 for supporting the mirror head 34 so as to be foldable in and counter to the travel direction. In the mirror head 34 the vehicle light 5c is arranged according to the configuration of FIG. 6. However, in contrast to this embodiment, the forwardly oriented wall 35 of the mirror head 34 (in the travel direction) is provided with an opening 37 extending from the edge of the mirror head 34 facing away from the base member 33 in the direction toward the base member 33 and ending at a spacing from the base member 33. In this opening 37, the vehicle light 5c is inserted such that the exterior side 14c of the lens 13c is flush with the outer side of the wall 35. In order for the lens 13c, and thus the vehicle light 5c, to be invisible from the exterior, the exterior side 14c of the lens 13c is provided with a coating that is advantageously a paint coat. In accordance with the preceding embodiments, this paint coat is only so thick that the lens 13c is covered but the light emitted by the illumination element of the vehicle light 5c can pass through in a sufficient amount. Advantageously, the coating of the lens 13c has the same color as the coating of the remaining portion of the wall 35. The coating can be applied such that the gap 38 between the edge 37 and the lens 13c is completely covered. In this case, the wall 35 has a continuous smooth paint coat so that the mirror head 34 has the same appearance as a mirror head without opening and without vehicle lights. However, it is also possible not to cover the gap 38 between the edge of the opening and the edge of the lens 13c with the coating for the reason of design considerations. The lens 13c in any case is covered such by this coating that, as long as the vehicle light 5c is not switch on, it cannot be recognized from the exterior of the vehicle. The gap 38 is in any case sufficiently sealed so that moisture and/or dirt cannot reach the interior of the mirror head 34.

The exterior rearview mirror 32 can also contain at least one illumination element within the base member 33. This illumination element can be provided in addition to the vehicle light 5c in the mirror head 34. However, it is also possible that the mirror head 34 is not provided with a vehicle light in this case.

Figure 7:
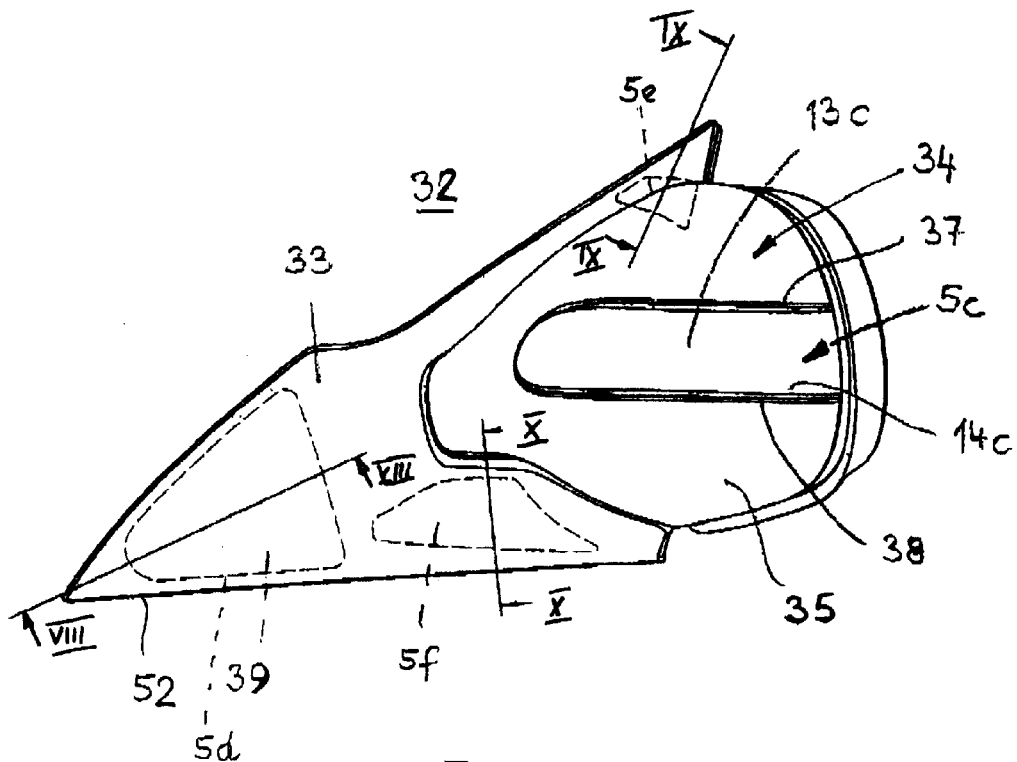
FIG. 7 shows in a view from the rear an exterior rearview mirror of a motor vehicle comprising another embodiment of the vehicle light according to the present invention.
Figure 8:
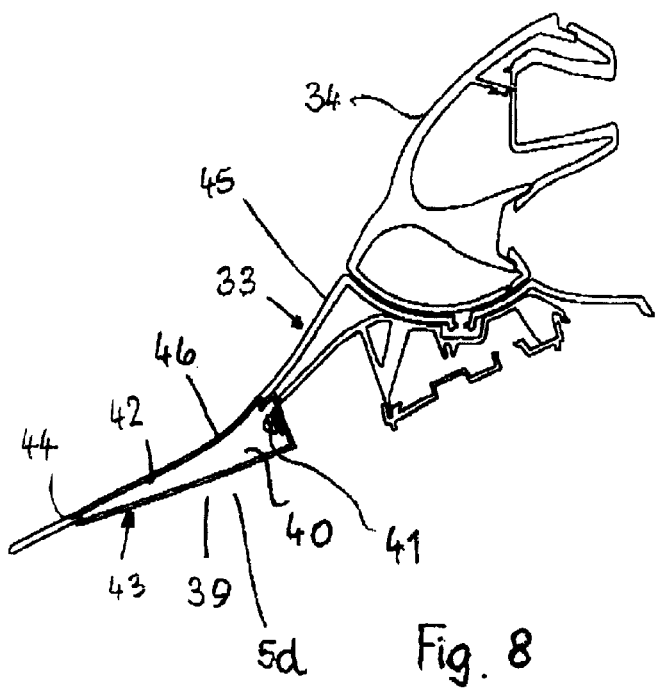
FIG. 8 shows a section along the line XIII—XIII of FIG. 7.

FIG. 7 shows in dashed lines three exemplary mounting possibilities of the vehicle light in the base member 33 of the mirror. One mounting area 39 is provided in a corner of the base member 33. In the area 39 the base member 33 is provided with a receptacle 40 in which the vehicle lights 5d with at least one illumination element 41, preferably an LED, is arranged (FIG. 8). The light emitted by the illumination element 41 passes through the lens 42 to the exterior. The lens 42 is a component of a vehicle light housing 43 in which the illumination element 41 is arranged. The lens 42 fills on opening 44 provided in the base member 33. The exterior side of the lens 42 forms a continuous (uninterrupted) extension of the outer side 45 of the mirror base member 33. The lens 42 is comprised of a light-transmissive material. On the exterior side of the lens 42 a coating 46 is supplied which is advantageously a coat of paint. The coating 46 is so thick that the lens 42 cannot be detected from the exterior but so thin that the light emitted by the illumination element can pass through the lens 42 and the coating 46 to the exterior with sufficient light intensity. The coating 46 has advantageously the same color as the coating provided on the outer side of the base member 33. As in the preceding embodiments, the vehicle light housing 43 is therefore not visible from the exterior when the illumination element is not switched on.

It is also possible that the base member 43 is not provided with a mounting opening 44 but that instead the vehicle light housing 43 is attached with the lens 42 to the inner side of the base member 33. In this case, the wall of the mirror base member 33 in the area of the lens 42 is made of transparent material and provided with the coating 46.

In this case, it is also possible to manufacture the entire mirror base member 33 of transparent material, i.e., the base member is continuous (uninterrupted) and has no mounting opening, and to apply a coating 46 to the transparent material. This coating is so thin in the area of the lens 42 that light beams can penetrate and reach the exterior.

Figure 9:
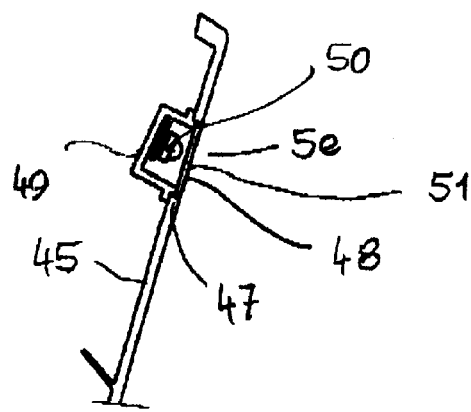
FIG. 9 shows a section along the line IX—IX of FIG. 7.
Figure 10:
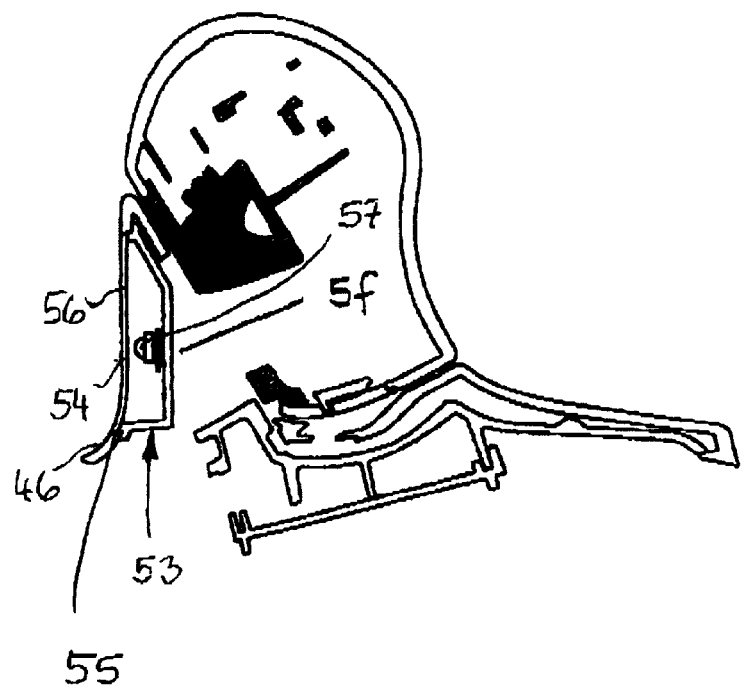
FIG. 10 shows a section along the line X—X of FIG. 7.

FIG. 9 shows another mounting possibility of the vehicle light 5e. As illustrated in FIG. 7, the vehicle light 5e is provided in the upper corner area of the base member 33. In this area, the base member 33 has a mounting opening 47 (FIG. 9) into which the vehicle light 5e is inserted such that the exterior side of the lens 48 is flush with the outer side 45 of the mirror base 33. The lens 48 is a part of the vehicle light housing 49 in which at least one illumination element 50, preferably an LED, is arranged. The lens 48 is comprised of light-transmissive material and is provided with a coating 51 which is so thick, in accordance with the preceding embodiments, that the lens 48 cannot be recognized from the exterior but so thin that the light beams emitted by the illumination element 50 can reach the exterior with the necessary light intensity upon passing through the lens and the coating 51. The coating 51 is advantageously of the same color as the coating on the outer side of the base member 33.

The wall of the base member 33 in this area can also be configured to the continuous (uninterrupted), and the vehicle light 5e is attached to the backside (inner side) of this wall. The wall of the mirror base 33 in this area is manufactured of light-transmissive material and provided in this area with the coating 51. It is also possible to make the entire base member 33 of light-transmissive material and provide it with a coating. The coating is so thin in the area of the vehicle light 5e that the light emitted by the illumination element 50 will reach the exterior with the desired light intensity.

Finally, the mirror base 33 can have the vehicle lights 5f arranged in the area of the edge 52 of the base member facing the ground. The vehicle lights 5f in this case is positioned at least partially below the mirror head 34. The vehicle light 5f comprises again a housing 53 whose lens 54 is inserted into a mounting opening 55 of the base member 33. The exterior side of the lens 54 forms a continuous extension of the outer side 45 of the mirror base member. The lens comprised of light-transmissive material is provided with a coating 56 which, according to the preceding embodiments, is preferably embodied by a coat of paint. The coating 56 is so thick that the lens 54 cannot be recognized from the exterior but so thin that the light emitted by the illumination element 57 within the housing 53 can penetrate with the required light intensity to the exterior. The coating 56 on the lens 54 is advantageously of the same color as the coating on the base member 33. It is also possible to configure the wall of the base member 33 in this area to be continuous and to attach the housing 53 on the inner side of the base member 33. The wall of the base member 33 in the area of the housing 53 is made of light-transmissive material. The coating of the base member 33 in this area is so thin that the light can pass through to the exterior. It is also possible to manufacture the entire base member 33 of light-transmissive material and to provide it with a coating that, in the area of the lens 56 or of the housing 53, is so thin that light can pass through to the exterior.

The mirror base member 33 has conventionally only one of the vehicle lights 5d through 5f. However, it is possible to arrange within the base member 33 two or more additional lights in the described way. In this connection, the mirror head 34 can also have the light 5c arranged therein.

While specific embodiments of the invention have been shown and described in detail to illustrate the inventive principles, it will be understood that the invention may be embodied otherwise without departing from such principles.

What is claimed is:

1. A vehicle light for motor vehicles, the vehicle light comprising:
   at least one vehicle light housing configured to be arranged on an inner side of a vehicle part of the vehicle, wherein the vehicle part has at least one mounting opening for mounting the at least one vehicle light housing;
   at least one illumination element arranged in the at least one vehicle light housing;
   wherein the vehicle light housing comprises a lens of light-transmissive material mounted in the at least one mounting opening such that an exterior side of the light-transmissive lens is flush with an outer side of the vehicle part;
   a light-transmissive coating applied onto the exterior side of the lens, wherein the light-transmissive coating has a color matching a color of a coating of the vehicle part and wherein the light-transmissive coating has a thickness such that the lens when the at least one illumination element is switched off is invisible from the exterior of the vehicle and such that the lens allows light emitted by the at least one illumination element to pass through when the at least one illumination element is switched on.

2. The vehicle light according to claim 1, wherein the vehicle part is a trunk lid of the vehicle.

3. The vehicle light according to claim 1, wherein the vehicle part is a rear hatch of the vehicle.

4. The vehicle light according to claim 1, wherein the vehicle part is comprised of light-opaque material.

5. The vehicle light according to claim 4, wherein the vehicle part is made of metal.

6. The vehicle light according to claim 1, wherein the vehicle part is comprised of plastic material.

7. The vehicle light according to claim 6, wherein the plastic material is a light-transmissive material.

8. The vehicle light according to claim 7, wherein the plastic material is coated with a coat of paint.

9. The vehicle light according to claim 1, wherein the vehicle part and the lens are comprised of light-transmissive plastic material.

10. The vehicle light according to claim 9, wherein the light-transmissive plastic material of the vehicle part and the light-transmissive plastic material of the light-transmissive area are identical.

11. The vehicle light according to claim 1, wherein the lens has an edge, wherein between the edge of the lens and an edge of the mounting opening a gap is defined, and wherein the gap is covered.

12. The vehicle light according to claim 11, wherein the gap is covered from the outer side of the vehicle part.

13. The vehicle light according to claim 12, comprising a cover element connected to the outer side of the vehicle part, wherein the gap is covered by the cover element.

14. The vehicle light according to claim 13, wherein the cover element is an emblem or a symbol.

15. The vehicle light according to claim 13, wherein the cover element is light-opaque.

16. The vehicle light according to claim 14, wherein the vehicle part is at least partially light-transmissive in an area underneath the emblem.

17. The vehicle light according to claim 14, wherein the vehicle part is light-opaque in an area surrounded by the emblem.

18. The vehicle light according to claim 11, wherein the gap is covered from the inner side of the vehicle part.

19. The vehicle light according to claim 18, further comprising at least one sealing element, wherein the lens comprises at least one support part arranged at a spacing from the inner side of the vehicle part and configured to receive the at least one sealing element.

20. The vehicle light according to claim 19, wherein the at least one sealing element is an O-ring.

21. The vehicle light according to claim 19, wherein the at least one support part is an annular flange projecting radially from the lens.

22. The vehicle light according to claim 19, wherein the at least one vehicle light housing has a shoulder surface and wherein the at least one support part rests against the shoulder surface.

23. The vehicle light according to claim 1, wherein the lens is centered by the at least one vehicle light housing.

24. The vehicle light according to claim 1, further comprising at least one optical element positioned in a path of light rays emitted by the at least one illumination element.

25. The vehicle light according to claim 24, wherein the at least one optical element is a Fresnel lens.

26. A vehicle light for motor vehicles, the vehicle light comprising:
- at least one vehicle light housing comprising a lens and configured to be arranged on an inner side of a continuous vehicle part of the vehicle, wherein the vehicle part consists of a light-transmissive material;
- at least one illumination element arranged in the at least one vehicle light housing and emitting light through the lens;
- a light-transmissive coating applied onto an outer side of the vehicle part, wherein the light-transmissive coating has a thickness in an area of the lens such that, when the at least one illumination element is switched off, the lens is invisible from the exterior of the vehicle and such that light emitted by the at least one illumination element pass through the coating when the at least one illumination element is switched on.

\* \* \* \* \*